United States Patent [19]

Gray

[11] Patent Number: 5,394,962
[45] Date of Patent: Mar. 7, 1995

[54] BRAKING DEVICES

[76] Inventor: Andrew P. Gray, The Point, 35 Moor Lane, Copmanthorpe, York, N. Yorks, Great Britain, YO2 3TJ

[21] Appl. No.: 108,656
[22] PCT Filed: Mar. 4, 1992
[86] PCT No.: PCT/GB92/00382
  § 371 Date: Sep. 1, 1993
  § 102(e) Date: Sep. 1, 1993
[87] PCT Pub. No.: WO92/15476
  PCT Pub. Date: Sep. 17, 1992

[30] Foreign Application Priority Data

Mar. 5, 1991 [GB] United Kingdom ............... 9104555

[51] Int. Cl.⁶ ........................................... B62B 5/04
[52] U.S. Cl. ........................... 188/1.12; 188/5; 188/111; 280/33.994
[58] Field of Search ............... 188/1.12, 111, 110, 188/31, 60, 69, 62, 19, 5-8, 4 B, 4 R, 167, 161; 16/35 R; 280/33.994

[56] References Cited

U.S. PATENT DOCUMENTS

| | | | |
|---|---|---|---|
| 2,964,140 | 12/1960 | Berezny . | |
| 3,031,037 | 4/1962 | Stollman . | |
| 3,031,038 | 4/1962 | Chait | 188/111 |
| 3,044,577 | 7/1962 | Lotz | 188/5 |
| 3,090,470 | 5/1963 | Abrams | 280/33.994 |
| 3,117,655 | 1/1964 | Skupas et al. | 188/111 |
| 3,217,839 | 11/1965 | Watkins et al. | 280/33.994 |
| 3,434,571 | 3/1969 | Shuler . | |
| 3,495,688 | 2/1970 | Isaacks | 188/110 |
| 3,590,962 | 7/1971 | Parker et al. | 188/111 |
| 3,652,103 | 3/1972 | Higgs | 188/19 |
| 3,892,295 | 7/1975 | Hahto . | |
| 4,242,668 | 12/1980 | Herzog | 340/552 |
| 4,577,880 | 3/1986 | Bianco | 188/1.12 |
| 4,609,075 | 9/1986 | Snedeker | 280/33.994 |
| 4,772,880 | 9/1988 | Goldstein et al. | 280/33.994 |
| 4,985,960 | 1/1991 | Zun | 188/1.12 |

FOREIGN PATENT DOCUMENTS

| | | | |
|---|---|---|---|
| 510911 | 5/1952 | Belgium | 188/5 |
| 248996 | 5/1926 | Italy | 188/5 |
| 65838 | 4/1913 | Switzerland | 188/5 |
| 69093 | 6/1914 | Switzerland | 188/5 |
| 12181 | 5/1915 | United Kingdom | 188/5 |

*Primary Examiner*—Douglas C. Butler
*Attorney, Agent, or Firm*—Watson, Cole, Grindle & Watson

[57] ABSTRACT

A braking device for a wheeled vehicle such as a cart or trolley includes a braking member which can contact the ground and lift the vehicle to impede further movement thereof, a blocking member which can block the braking member to prevent its contact with the ground, and a trigger which is actuated by a magnet in the ground to release the blocking member and its blocking relationship with the braking member.

10 Claims, 4 Drawing Sheets

BRAKING DEVICES

This application is a 371 of PCT/GB92/00382, filed Mar. 4, 1992.

BACKGROUND OF THE INVENTION

This invention relates to braking devices, and particularly but not exclusively to braking devices for use with wheeled trolleys to deter their removal from designated areas.

A particular problem with supermarket-type shopping trolleys or carts is the removal of those trolleys from designated areas, such as the supermarket and/or its parking lot. Although various systems have been proposed for placing physical obstacles such as grids and/or narrow stalls at the exit points from these designated areas, which obstacles are intended to interact with the trolley's castor wheels or with the trolley itself to deter its removal, these known systems are easily overcome and are also unsuitable for certain applications, such as vehicle entrances to supermarket parking lots.

SUMMARY OF THE INVENTION

According to one aspect of the present invention there is provided a braking device comprising a first portion, a further portion arranged to move relative to the first portion between an inoperative position and an operative braking position, blocking means for normally blocking movement of the further portion to its operative position, and trigger means for releasing the blocking means to allow movement of the further portion to its operative position in response to the passage of the device in close proximity to magnetic material.

Advantageously, the further portion is arranged to rotate relative to the first portion, and may be circular, with the axis of its rotation offset from the centre of the circle. A portion of the outer circumference of the further portion may include a friction surface arranged to grip the surface over which the device is passing when the further portion is in its operative position, whereby to impede movement of the device relative to the surface, preferably by causing the first portion of the device to be raised relative to the surface.

The trigger means advantageously comprises a member mounted on the first portion of the device, which is arranged to move from a primed position to a triggered position to release the blocking means in response to the passage of the device in close proximity to magnetic material. The trigger member may be pivotally mounted to rotate between its primed and triggered positions. Advantageously, the trigger member comprises a magnetic pole portion, which is arranged to be attracted by, for example, a body of ferrous metal or a body having a pole portion of opposite polarity, or repelled by, for example, a body having a pole portion of the same polarity, in or on the surface over which the device is passed.

The centre of gravity of the pivotable trigger member may be arranged to coincide with the axis about which the member is arranged to rotate.

The trigger means may be arranged so that, in rotating from its primed position to its triggered position, the distance varies between the magnetic pole portion and the surface over which the device is passed. Where for example, the magnetic pole portion is chosen to be attracted to a body of magnetic material such as ferrous metal, or a body having a pole portion of opposite polarity in the surface, this distance is arranged to reduce.

The blocking means may be mounted on the first portion and arranged, in its blocking position, to co-operate with interference means provided on the further portion to block movement of the further portion to its operative position. The blocking means may be arranged, upon its release by the trigger means, to move from its blocking position to remove the block on movement of the further portion to its operative braking position.

The pivotable member of the trigger means may be provided with cam means to cause movement of the blocking means from its blocking position upon movement of the pivotable member from its primed to its triggered position.

The blocking means advantageously comprises an interference portion which is arranged to co-operate with the interference means of the further portion in the blocking position of the blocking means. This interference portion may be arranged to be moved towards its released position by cam means provided on the trigger member, upon movement of the trigger member from its primed to its triggered position.

Advantageously, under normal steady state conditions, the interference means provided on the further portion is arranged to prevent movement of the blocking means from its blocking position, and hence to prevent release of the blocking means. In such an arrangement, the interference portion of the blocking means may be arranged to be moved by the cam means of the trigger member in a first general direction towards its released position, after initially moving from its blocking position in a second opposite general direction, upon movement of the trigger member away from its primed position towards its triggered position. This second general direction is advantageously away from the centre of the device, towards the interference means of the further portion. The interference means provided on the further portion may be positioned outwardly of the interference portion of the blocking means to block this initial movement of the blocking means, and hence to prevent release of the blocking means. In such an arrangement, the centre of gravity of the further portion may be offset horizontally from the rotational axis of the further portion such that, in steady state conditions, the further portion has a natural tendency to rotate in a first rotational direction about its axis to maintain the interference means in contact with the interference portion of the blocking means, and hence prevent initial movement and release of the blocking means.

The offset of the centre of gravity may be arranged so that, upon jarring of the device, the further portion rotates in a second rotational direction, opposite to the first rotational direction, removing the block on movement of the interference portion of the blocking means in the second general direction which is advantageously away from the centre of the device. By combining the jarring of the device with the passage of the device in close proximity to magnetic material, the block on initial movement of the interference means in the second general direction may be removed for long enough for the trigger member to move from its primed to its triggered position. The device may be arranged so that, once the blocking means has been released, the natural tendency of the further portion to rotate in said first rotational direction causes the further portion to rotate to its operative braking position. Alternatively or additionally, mechanical means, for example in the form of a spring bias, may be provided to assist rotation of the further portion to its operative position.

Alternatively, where a block on initial movement of the blocking means from its blocking position is not required, the centre of gravity of the further portion may be offset from the rotational axis of the further portion such that, under normal steady state conditions, the further portion has a natural tendency to rotate in said second rotational direction. In such an arrangement, the centre of gravity of the further portion may be arranged such that, following release of the blocking means by the passage of the device in close proximity to magnetic material, tilting or deceleration of the device causes the further portion to rotate in said first direction to carry the centre of gravity over its top dead centre position, whereupon the further portion will continue to rotate in said first direction to its operative position.

Irrespective of whether the interference means is arranged to block initial movement of the blocking means, the first portion may be provided with stopping means arranged to co-operate with the interference means to limit rotation of the further portion from its inoperative position in said second rotational direction.

Advantageously, re-set means are provided for re-setting the device after movement of the further portion to its operative braking position. The re-set means may be arranged to return the trigger member to its primed position, and to return the blocking means to its blocking position. This re-setting may be achieved by rotation of the further portion in the second rotational direction past its inoperative position. For example, at least one of the interference and stopping means may be arranged to be temporarily by-passed to allow the interference means to pass the stopping means in the second rotational direction. Advantageously, security means are provided to prevent operation of the by-pass by unauthorized persons. The re-set means may comprise cam means provided on the further portion which are arranged to operate on the pivotally mounted trigger member and on the blocking means to return them to their primed and blocking positions respectively.

The blocking member may alternatively be longitudinally slideable. The blocking member may comprise an elongate member whose top region is arranged to co-operate with the interference means of the further portion in the blocking position of the blocking member. The base of the elongate member may be arranged to ride over a camming surface of the trigger member. At least a portion of the blocking member may advantageously be made of magnetic material to allow the blocking member to be re-set to its blocking position by the application of a strong magnetic field to the device.

According to a further aspect of the present invention there is provided a castor including a braking device as described above.

According to a yet further aspect of the present invention there is provided a trolley including at least one braking device and/or a castor as above-described.

According to an even further aspect of the present invention there is provided a castor including a braking device for braking the castor, the braking device comprising a rotatably mounted portion normally held in an inoperative position by blocking means, the blocking means being releasable by passing the device past magnetic material to permit rotation of said portion to an operative braking position, in which braking position said portion is arranged to contact the ground whereby continued movement of the castor causes said portion to act to lift the castor out of contact with the ground to impede the continued movement of the castor.

Further features and advantages of the present invention will become apparent from the following description of an embodiment thereof, given by way of example only, with reference to the accompanying drawings.

DETAILED DESCRIPTION OF THE PREFERRED EMBODIMENT

Figure 1:
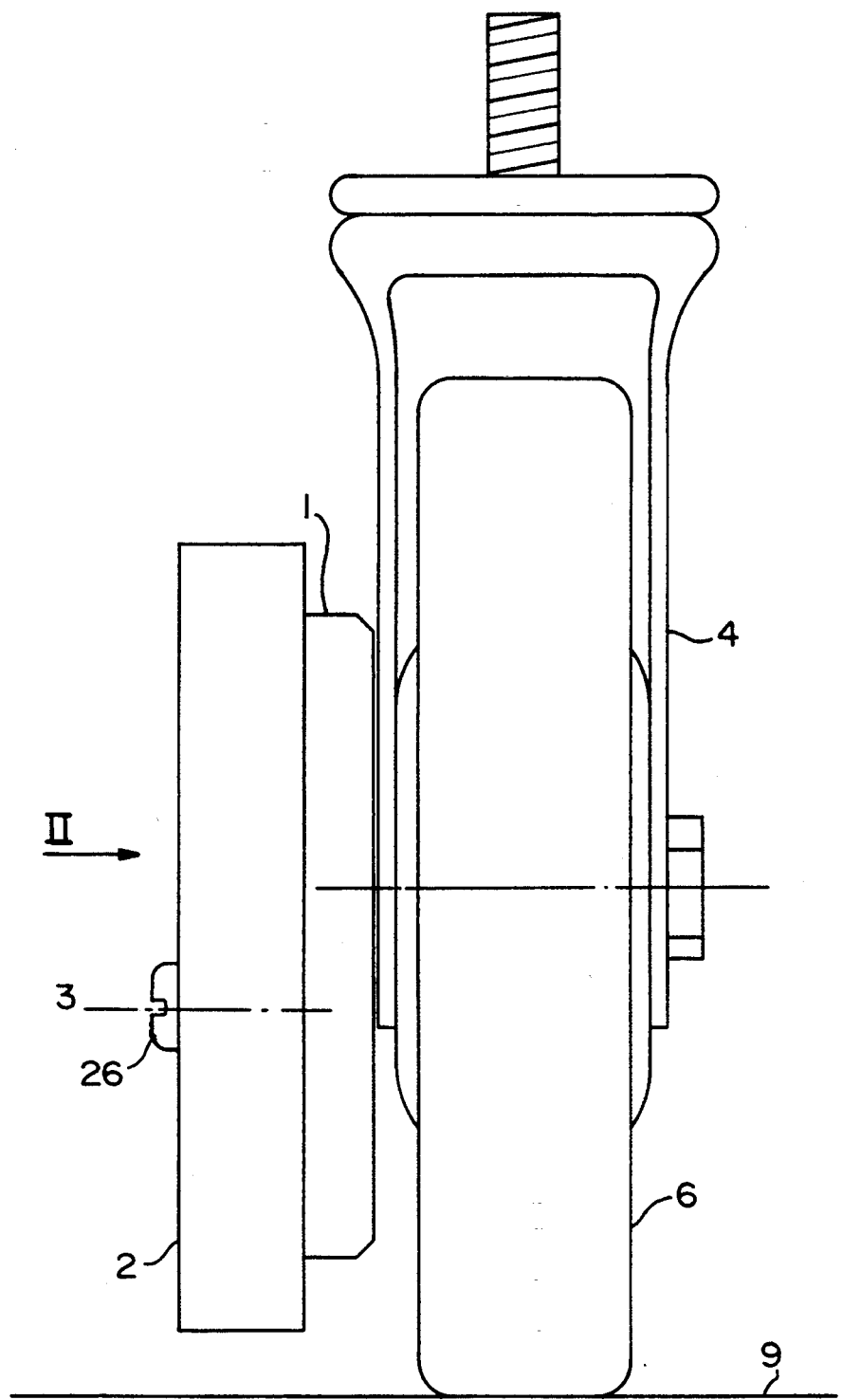
FIG. 1 shows an embodiment of device in accordance with the present invention attached to a castor of known type.

The device comprises a first portion 1 and a further portion 2 arranged to move relative to the portion 1. In the illustrated embodiment, the further portion 2 is circular and is arranged to rotate eccentrically about an axis 3, and the portion 1 is attached to the fork of a castor 4 by fixing means 5 coincident with the axis of rotation of the castor wheel 6. The fixing means 5 pass through an elongate slot 30 in portion 1. This slot 40 allows for adjustment of the position of the device relative to the castor 4.

The portion 1 is provided around its circumference with a lip 7 dimensioned to sit in a circular recess 8 on the inside surface of rotatable portion 2. The stub axle 24 of the portion 1 is arranged to co-operate with boss 25 to act as a bearing surface. The stub axle 24 may be threaded to receive fixing means, such as a screw headed bolt 26, for holding the two portions 1,2 together. The rotatable portion 2 is arranged to rotate about axis 3 between an inoperative position (shown in solid lines in FIG. 2) and an operative braking position (shown in broken lines in FIG. 2). In the illustrated embodiment, movement between the inoperative and operative positions involves a rotation of the portion 2 in a first rotational direction, in the direction of arrow A, through an angle of approximately 30°–60°, such that the outer circumference of the portion 2 contacts the surface 9 over which the castor wheel rotates.

Figure 2:
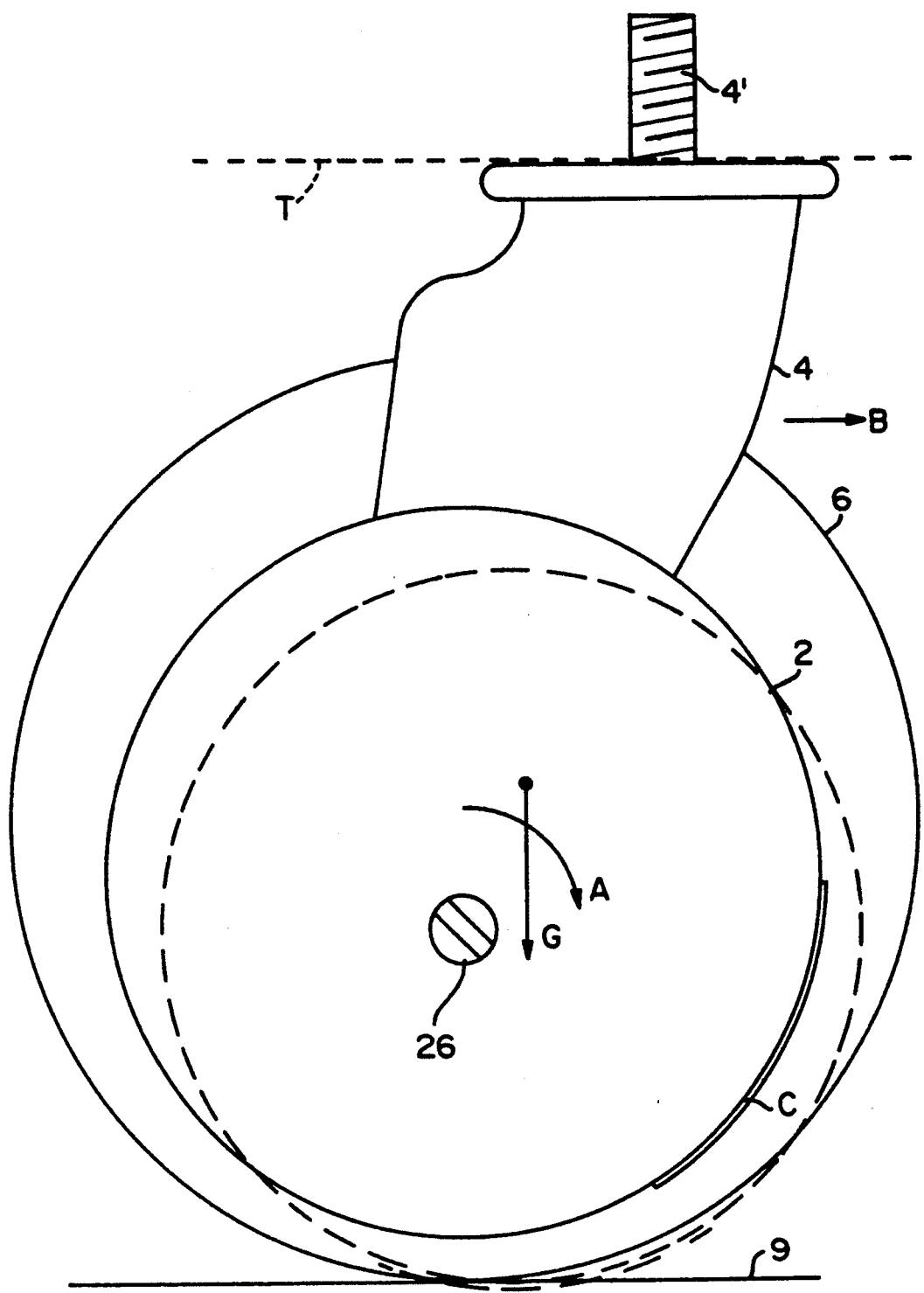
FIG. 2 is a side elevation of the device viewed in the direction of arrow II in FIG. 1 showing the further portion in both its inoperative and operative positions.

Because of the self-aligning action of castors, the castor 4 will track by rotating about its axis 4 to face in the direction of travel, see arrow B in FIG. 2. The circumference of the rotatable portion 2 may, as shown in area C (at least), have a high-grip finish so that, where the caster is provided on a trolley T and the portion 2 is in its operative position, the area C will grip the surface 9 over which the trolley is being pushed, causing continued movement of the trolley in direction B to rotate the portion 2 further in direction A than the position shown in broken lines in FIG. 2. The eccentric shaping of portion 2, whose axis of rotation 3 is offset from its centre, will thus cause the castor 4 to be lifted off the surface 9 to impede progress of the trolley. Ratchet means (not shown) may be provided between portions 1,2 to prevent rotation of the portion 2 in the direction opposite to direction A. Also, portion 1 may be provided with means, such as a projection 21, to limit the maximum extent of the rotation of portion 2 in direction A, as will later be described. It will be appreciated from the foregoing that the portion 2 need not be circular. The further portion 2 ideally requires a first portion of which the radius is less than the distance of axis 3 to the surface 9 and a second portion of which the radius is greater than the distance of axis 3 from the surface 9 and a transitional portion adjacent the second portion which is arranged initially to contact the ground when the further portion 2 rotates towards its operative braking position. One alternative to the circular shape of the illustrated further portion 2 is an oval, which can be readily arranged to have its centre of gravity higher than axis 3.

To control rotation of portion 2, the device is provided with blocking means to normally prevent movement of the further portion 2 to its operative position. Furthermore, trigger means are provided for releasing the blocking means to allow movement of the further portion to its operative position. These trigger means are arranged to be operated by the passing of the device in close proximity to magnetic material, be it simply ferrous material or a magnetic pole portion.

Figure 3:
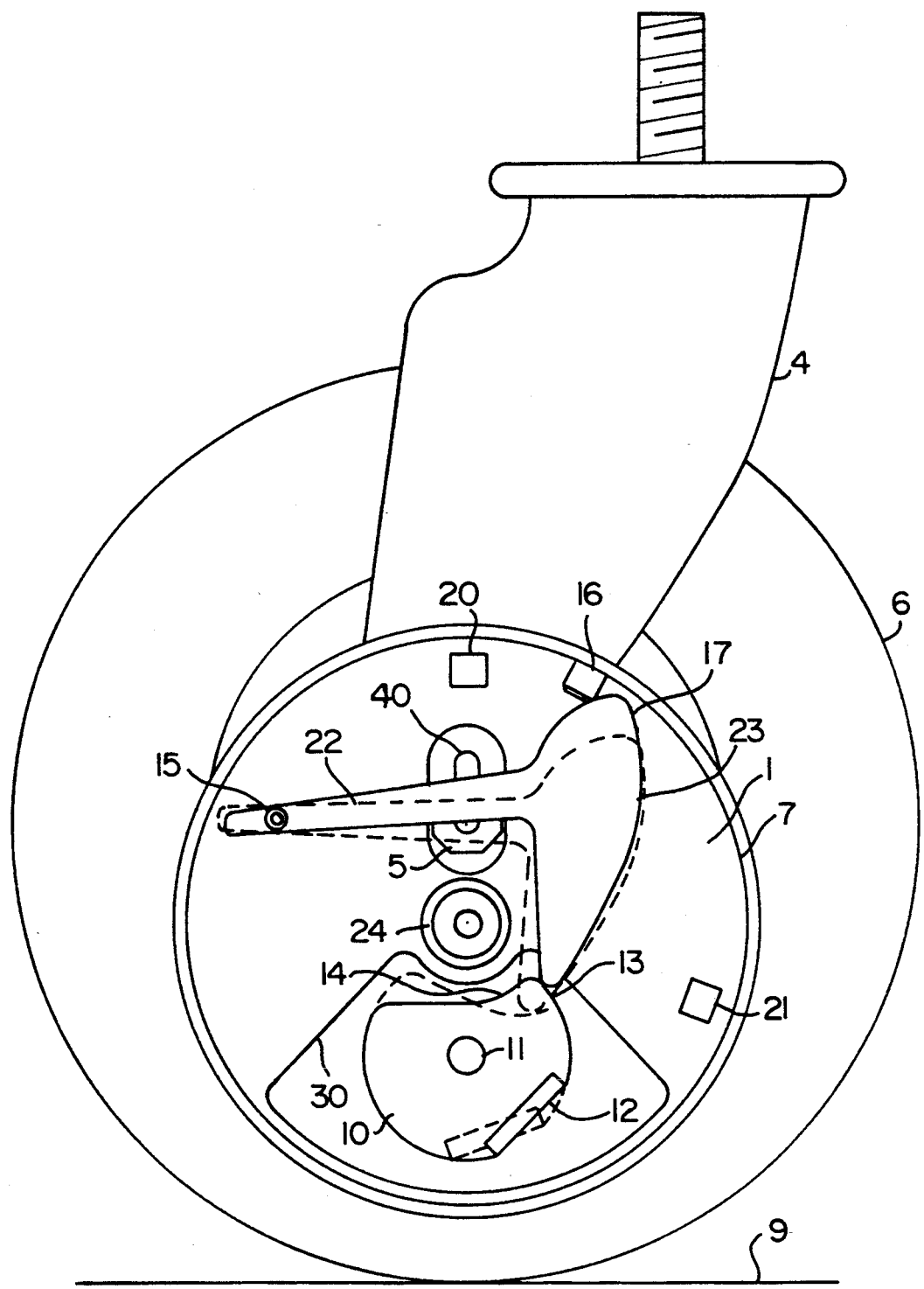
FIG. 3 is a side elevational view of the device of FIG. 1, with the further portion removed.
Figure 4:
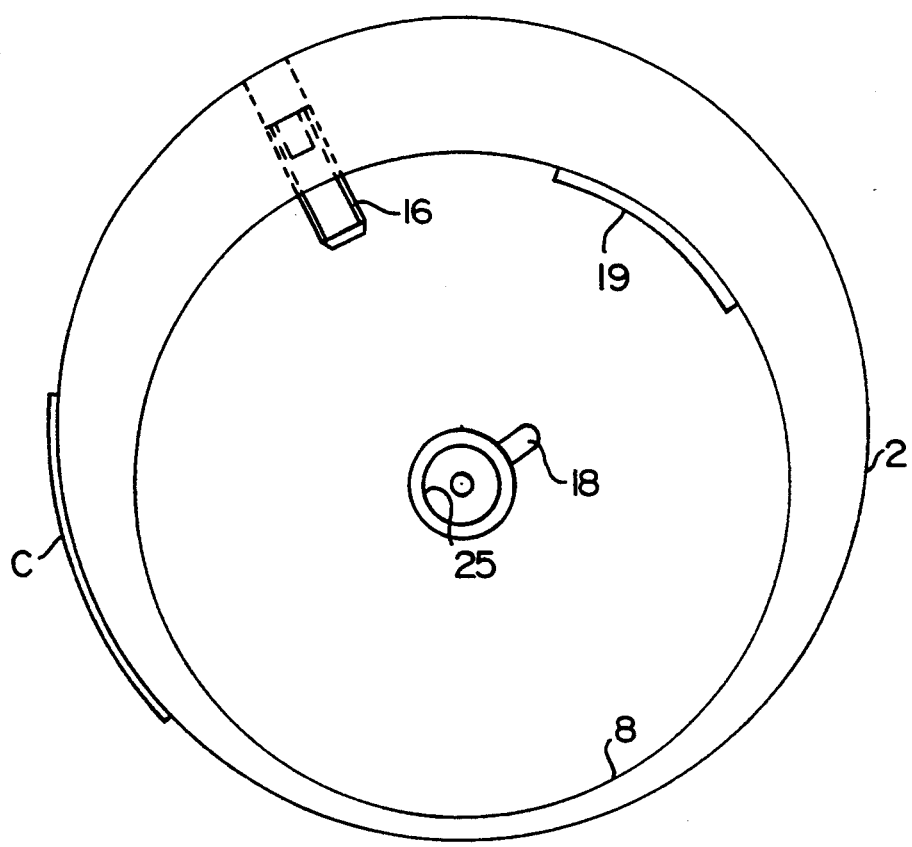
FIG. 4 is a rear-elevational view of the removed further portion.

In the illustrated embodiment, the trigger means comprise a member 10, mounted on a stub axle 11 in a recess 30 in the face of the portion 1, for rotation between a primed position, shown in solid lines in FIG. 3, and a triggered position shown in broken lines. The pivotable member 10 includes a magnetic pole portion 12 so that, when the device passes over a body of ferrous metal (or a body containing a pole portion of opposite polarity in surface 9) whilst being moved in the direction of travel indicated by arrow B, the attraction between the pole portion 12 and the magnetic material in surface 9 will try to rotate the pivotable portion 10 from its primed position to its triggered position. Although in the illustrated embodiment the trigger member 10 includes a magnetic pole portion, it will be appreciated that the member may simply be made, either wholly or in part, of magnetic material and be arranged to be rotated upon passing over a body in surface 9 containing a magnetic pole portion. Ideally, the centre of gravity of the pivotable trigger member 10 is arranged to be coincident with the axis 11.

Where the trigger member 10 is not provided with a magnetic pole portion, rather than making the whole trigger member out of magnetic material, e.g. ferrous material, advantageously only a portion of the trigger member is made of magnetic material. This portion is preferably offset laterally from the axis 11 of the trigger member (in the manner of the offset of the pole portion 12 in FIG. 3) so as to encourage the trigger member 10 to rotate when the device is passed over a magnetic pole portion in or on surface 9.

The top portion of the trigger member 10 is provided with cam means in the form of two cam surfaces 13 and 14, which surfaces are arranged to act on the blocking means (as will be described below) when the trigger member rotates from its primed to its triggered position.

In the illustrated embodiment, the blocking means comprises a generally hammer-shaped blocking member 22, pivotally attached to the portion 1 at a pivot point 15. The blocking member is arranged to pivot between a blocking position (shown in solid lines in FIG. 3) and a released position (shown in broken lines in FIG. 3). The lowest portion of the head 23 of the hammer-shaped blocking member 22 is arranged to slidably co-operate with the cam surfaces 13, 14 of the trigger member 10, so that rotation of the trigger member 10 about the axis 11 (between its primed and triggered positions) causes upward and downward movement of the blocking member between its blocking and released positions.

In its blocking position, the uppermost portion 17 of the head 23 of the hammer-shaped blocking member is arranged to co-operate with interference means 16 provided on the further portion 2, to block rotation of the further portion to its operative braking position. Upon its release by the trigger member 11 rotating from its primed to its triggered position, cam surfaces 13 and 14 cause the blocking member to move from its blocking position to remove the block on rotation of the further portion 2 in the direction of arrow A to its operative braking position.

The released position of the head 23 of the blocking member is lower than the blocking position, so that the head 23 moves generally inwardly, towards the centre of the device, upon movement of the blocking member from its blocking to its released positions. In the illustrated, preferred embodiment, it will be noted that the shaping of cam surfaces 13 and 14 is such that, in moving from its primed position to its triggered position, initial movement of the head of the blocking member will be upwards, away from the centre of the device, due to the raised apex of trigger member 10 between cam surfaces 13 and 14.

Although in the illustrated embodiment the blocking means comprises a blocking member 22 which pivots between its blocking and released positions, the blocking means may alternatively be arranged to move linearly between said positions. For example, an elongate blocking member (not illustrated) may be provided, arranged generally vertically above the trigger member, such that when the trigger member moves to its triggered position it allows the blocking member to slide downwardly to its released position, out of co-operation with the interference means 16.

In the illustrated embodiment, the centre of gravity G of the further portion 2 is offset horizontally and vertically from the rotational axis 3 such that, in normal steady state conditions, the further portion 2 has a natural tendency to rotate in direction A about axis 3. As a result, in the steady state condition the interference projection 16 occupies a position (shown in chain dotted lines in FIG. 3) generally radially outwardly of the uppermost interference portion 17 of the blocking member, so preventing upward movement of the blocking member. The advantage of this illustrated arrangement is that, should the device be inadvertently passed over a metallic or magnetic object that is not intended to operate the device, the positioning of projection 16 above interference portion 17 of the blocking member prevents the initial upward movement of the blocking member, and hence prevents inadvertent release of the blocking means and rotation of the further portion 2 to its operative braking position, unless the further portion 2 is also rotated in the direction opposite to direction A to remove projection 16 from its position (shown in FIG. 3) in which it impedes the initial upward, generally radially outward, movement of the interference portion 17 of the blocking member. Where the device is to be applied to the castors of shopping trolleys, there may often be pieces of magnetic material, for example steel reinforcing rods in the shop floor, which attract the magnet 12, yet are not intended to operate the device.

In order to prevent this safety feature from preventing operation of the device when it is required, such as at the exit of a supermarket car park, the feature is provided with an override function. In the illustrated embodiment, the offset of the centre of gravity G is arranged so that, upon jarring of the device, the whiplash effect of this jarring causes the further portion 2 to rotate by a small amount about axis 3 in a second rotational direction, opposite to direction A, removing projection 16 from its position immediately above portion 17 of the blocking member head 23, so that should this jarring be made to coincide with the device passing over magnetic material, initial upward movement of the blocking member is not prevented, with the result that the trigger member is able to move to its triggered position to set off the sequence of release of the blocking means and rotation of the further member 2 to its braking position.

As an alternative to Jarring, the further portion 2 may be arranged such that, when the device is tilted in an counter-clockwise direction (as shown) opposite to direction A, the centre of gravity G transfers from the right-hand side of the axis 3 to the left-hand side, causing the further portion 2 to rotate relative to the first portion 1 in an counter-clockwise direction removing projection 16 from its position above portion 17.

By combining the passage of the device in proximity to magnetic material with a jarring or tilting action as described above, the magnetic material can be made to cause the device to operate. For example, where the device is provided on a supermarket trolley castor, the magnetic material positioned at the exit of the supermarket or from the supermarket parking lot may be associated with, for example, a bump or ramp in the surface 9 to cause the device to be jarred or tilted when the trolley is pushed over or up the obstacle. In this way it it possible to reduce or eliminate the risk of the device being operated inadvertently, yet not prevent it from being operated when it is required.

As an alternative to blocking initial movement of the blocking member from its blocking position, yet still preventing the device from being operated inadvertently, the device may be arranged so that the centre of gravity of the further portion 2 is, in the inoperative position of the further portion and under steady state conditions, positioned so as not to have a natural tendency to rotate towards its operative position. By first loosening the fixing means 5, the whole device may be rotated counter-clockwise so as to transfer the centre of gravity G of the further portion from above and to the right of axis 3 to above and to the left of the axis (for example by rotating the device through approximately 30°). The result of this is that, in its inoperative steady state condition, the further member 2 has a natural tendency to rotate counter-clockwise, in a direction opposite to direction A, and the projection 16 will rest against projection 20 rather than contacting interference portion 17 to impede the initial upward movement of the blocking member head 23. Accordingly, when the device is passed in close proximity to magnetic material, there is neither a block on movement of trigger member 10 from its primed to it triggered position, nor on release of the blocking member 22. The positioning of the centre of gravity G means that, when the blocking member 22 is released, the further portion will not usually rotate automatically towards its operative braking position. If, however, after the blocking means has been released, the device is tilted in direction A, jolted or decelerated causing the centre of gravity to move from the left to the right of an imaginary vertical line through axis 3, the tendency of the further portion 2 will be to rotate towards its operative braking position. Accordingly, by combining a ramp or hump with the magnetic material intended to trigger the device, the device can be made to operate only when required without physically blocking release of the blocking means in the manner of the illustrated embodiment.

If, under steady state conditions, the centre of gravity is selected to be only slightly off the top dead centre position, for example, by 1°-2°, the disturbance of the device necessary to cause the further portion to rotate clockwise from its steady state position past the top dead centre position may be small. Indeed, if the further portion 2 is finely balanced just off the top dead centre position, no ramp or hump may be necessary if, for example, the surface 9 is not totally smooth, as the vibration of the device caused by its passage over the surface 9 may be sufficient to cause the further portion 2 to over-balance and rotate to its operative position.

Where the device is intended to be used in an environment where there is unlikely to be a problem with the device being operated inadvertently, the safety feature described above, requiring the device to be jarred or tilted to operate, may be unnecessary.

The safety feature may also be unnecessary where the trigger member 10 is simply made of magnetic metallic material (e.g. ferrous metal) rather than (as shown in FIGS. 1-4) being provided with a strong magnetic pole portion per se. This is because, to operate the trigger member 10, the device will need to be passed over a magnetic pole portion rather than simply magnetic metallic material and, although magnetic metallic material is sometimes present in floor surfaces (e.g. steel reinforcing rods in concrete floors) it is extremely uncommon for magnetic pole portions to be so present, unless placed there deliberately. The above comment concerning the omission of the safety feature would also apply to the situation where the member 10 is provided with a weak pole portion which is not sufficiently strong as to cause the member to be triggered by passing over magnetic metallic material, instead needing to be passed over another pole portion of opposite magnetic polarity to cause triggering.

To omit the safety feature from a device of the illustrated type, with the device orientated relative to the castor as shown in FIGS. 1 to 4, the contacting surfaces of projection 16 and interference portion 17 may, instead of being shaped as shown in FIG. 3, be shaped so that projection 16 does not impede the initial upward movement of the head 23 of the blocking member. For example, the contacting surfaces of the projection 16 and portion 17 may both be parallel and generally radially directed and arranged to simply slide over each other when the head 23 moves initially upward. Alternatively, or additionally, in its steady state condition the further portion 2 may be arranged with its centre of gravity positioned only slightly off top dead centre, for example, by only a few degrees, so that the weight of the further portion does not unduly impede the initial upward movement of the head 23 of the blocking member. In this way, simply passing the device in close proximity to magnetic material could operate the device.

The device is provided with re-set means for re-setting the trigger means and blocking means after rotation of the further portion 2 to its operative braking position.

In the illustrated embodiment, the re-set means are arranged to return the pivotally mounted trigger member to its primed position and to return the blocking member to its blocking position. This is achieved by rotating the further portion in the second direction (opposite to direction A) so that cam surfaces 18, 19 make contact with the trigger member and blocking means and operate on them to return them to their primed and locking positions, respectively.

To prevent unauthorized persons from being able to re-set the device once it has operated, the portion 1 may, as shown, be provided with a fixed projection 20, which co-operates with projection 16 to limit rotation of further portion 2 in the direction opposite to direction A. In the illustrated embodiment, projection 16 is screw threaded and may be withdrawn radially outwardly by rotating it with a key to remove the radial overlap between projection 16 and 20, allowing the further portion 2 to be rotated in a direction opposite to direction A, passing withdrawn projection 16 over projection 20. Projection 16 may take other forms, such as for example a radially movable spring-loaded plunger which may be provided with locking means (not shown) to allow only authorized persons, such as supermarket security staff, to withdraw projection 16 and hence re-set the device.

Rather than employing mechanical means, such as cam surfaces 18, 19 (as described above), to re-set the trigger member 10 and blocking member 22 by moving them to their primed and blocking positions respectively, alternative means may be employed. For example, at least a portion (not shown) of the blocking member may be made of magnetic material so that, by placing a strong magnet against a side surface of the device and moving the strong magnet upwardly, the attraction between the magnetic material of the blocking member and the strong magnet may be used to raise the blocking member to its blocking position. The movement of the strong magnet may similarly be used to attract the trigger member 10 and move it to its primed position. Alternatively, or additionally, the trigger member 10 may be biased towards its primed position by spring means (not shown) which, when the blocking member is raised, acts to move the trigger member from its triggered to its primed position. This arrangement works particularly well when the blocking member 22 is linearly movable as discussed above.

In the operative braking position of the further portion 2, the projection 21 provided on portion 1 is intended to prevent the further portion from rotating too far in direction A, by contacting the projection 16.

Although in the illustrated embodiment the device is shown fixed to a castor, it may be mounted on a trolley independently of a castor in close proximity to the surface 9 and able to track like a castor by rotating about a vertical axis. Also, where a trolley has, for example, four wheels, which may or may not all have a castor action, it is not necessary that all the wheels be associated with a device of the type described. For example, with a supermarket trolley having four wheels, a single one of the castored wheels may be associated with a device of the type described, or two of the castored wheels, for example those at diagonally opposite corners of the trolley, may be associated with devices of the type described to prevent the trolley from being tilted to lift both devices away from the ground simultaneously. Where the device is mounted on a trolley castor, it is advantageously positioned on the inner side of the castor fork to protect it in collisions with curbs and the like.

Suitable materials for the manufacture of the components of the device include aluminium or zinc, which may be readily cast, or plastic which may be easily moulded.

I claim:

1. A braking apparatus attachable to a vehicle which moves along a surface, said braking apparatus comprising:
    a first portion which is attachable to said vehicle,
    a second portion which is operatively connected to said first portion and is pivotally mounted to move relative to said first portion between an inoperative position and an operative position, said second portion, when in said operative position, causing said first portion to be moved away from said surface to thereby brake movement of said vehicle along said surface,
    blocking means which is movable from a first position associated with said second portion to prevent movement of said second portion from said inoperative to said operative position, and a second position permitting movement of said second portion to said operative position, and
    trigger means pivotally mounted on the first portion for holding said blocking means in said first position and for releasing said blocking means to allow said blocking means to move from said first position to said second position upon passage of said trigger means over a magnet in said surface.

2. A braking apparatus as claimed in claim 1, wherein said second portion is generally disc-shaped and defines an imaginary center and including connection means for pivotally connecting said second portion to said first portion along an axis offset from said imaginary center of said second portion.

3. A braking apparatus as claimed in claim 2, wherein said second portion defines a peripheral surface having gripping means along a portion thereof to contact the surface along which the vehicle moves.

4. A braking apparatus as claimed in claim 1, including a pin means which extends through said trigger means and is connected to said first portion to pivotally connect said trigger means to said first portion.

5. A braking apparatus as claimed in claim 4, wherein said trigger means comprises a trigger member having a peripheral cam surface which said blocking means contacts, pivotal movement of said trigger members around said pin means causing said blocking means to move between said first and second positions.

6. A braking apparatus as defined in claim 5, wherein said trigger member includes a magnet therein.

7. A braking apparatus as claimed in claim 1, wherein said second portion includes an abutment stub which said blocking means contacts when in said first position.

8. A braking apparatus as claimed in claim 1, wherein said blocking means is generally hammer-shaped with a shaft and a head, wherein said shaft is pivotally connected to said first portion and said head contacts said trigger means.

9. A vehicle which is movable along a surface, said vehicle including a braking apparatus comprising:
    a first portion which is attachable to said vehicle,
    a second portion which is operatively connected to said first portion and is pivotally mounted to move relative to said first portion between an inoperative position and an operative position, said second portion, when in said operative position, causing said first portion to be moved away from said surface to thereby brake movement of said vehicle along said surface, blocking means which is movable from a first position associated with said second portion to prevent movement of said second portion from said inoperative to said operative position, and a second position permitting movement of said second portion to said operative position, and trigger means pivotally mounted on the first portion for holding said blocking means in said first position and for releasing said blocking means to allow said blocking means to move from said first position to said second position upon passage of said trigger means over a magnet in said surface.

10. A vehicle as claimed in claim 9, including a caster mounting a wheel, and wherein said first portion of said braking apparatus is attached to said caster.

* * * * *